H. WILCOX.
MOTOR DRIVEN VEHICLE TRAIN.
APPLICATION FILED OCT. 21, 1918.
1,308,315.
Patented July 1, 1919.
6 SHEETS—SHEET 1.
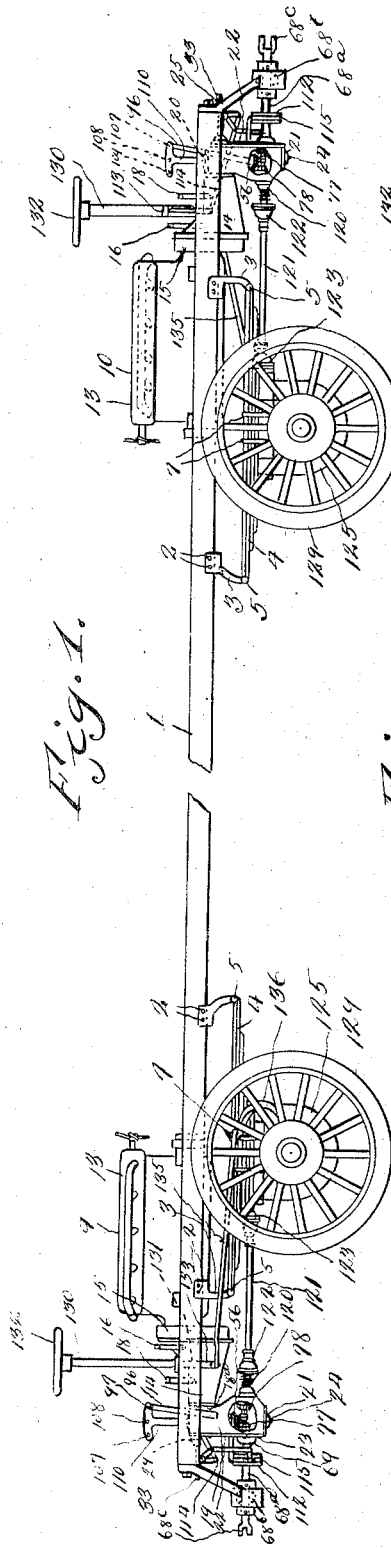
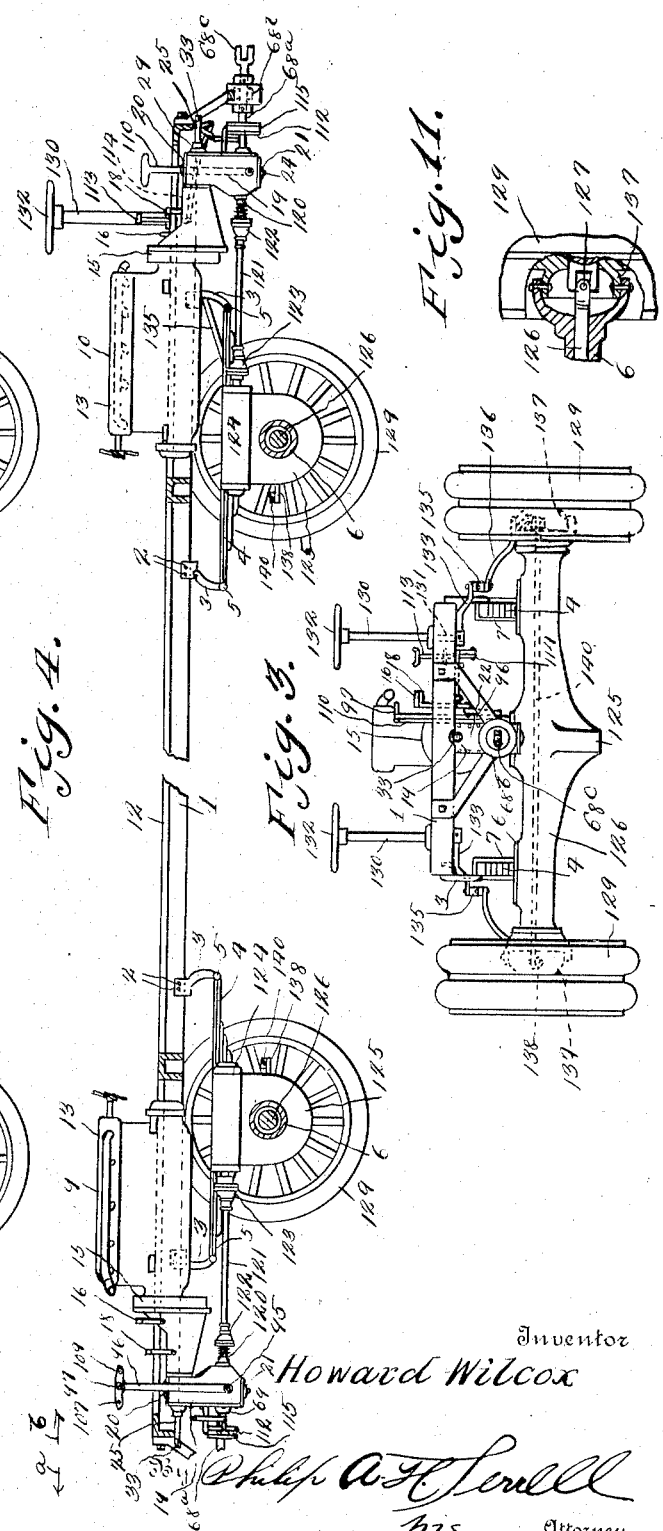
Inventor
Howard Wilcox
Attorney

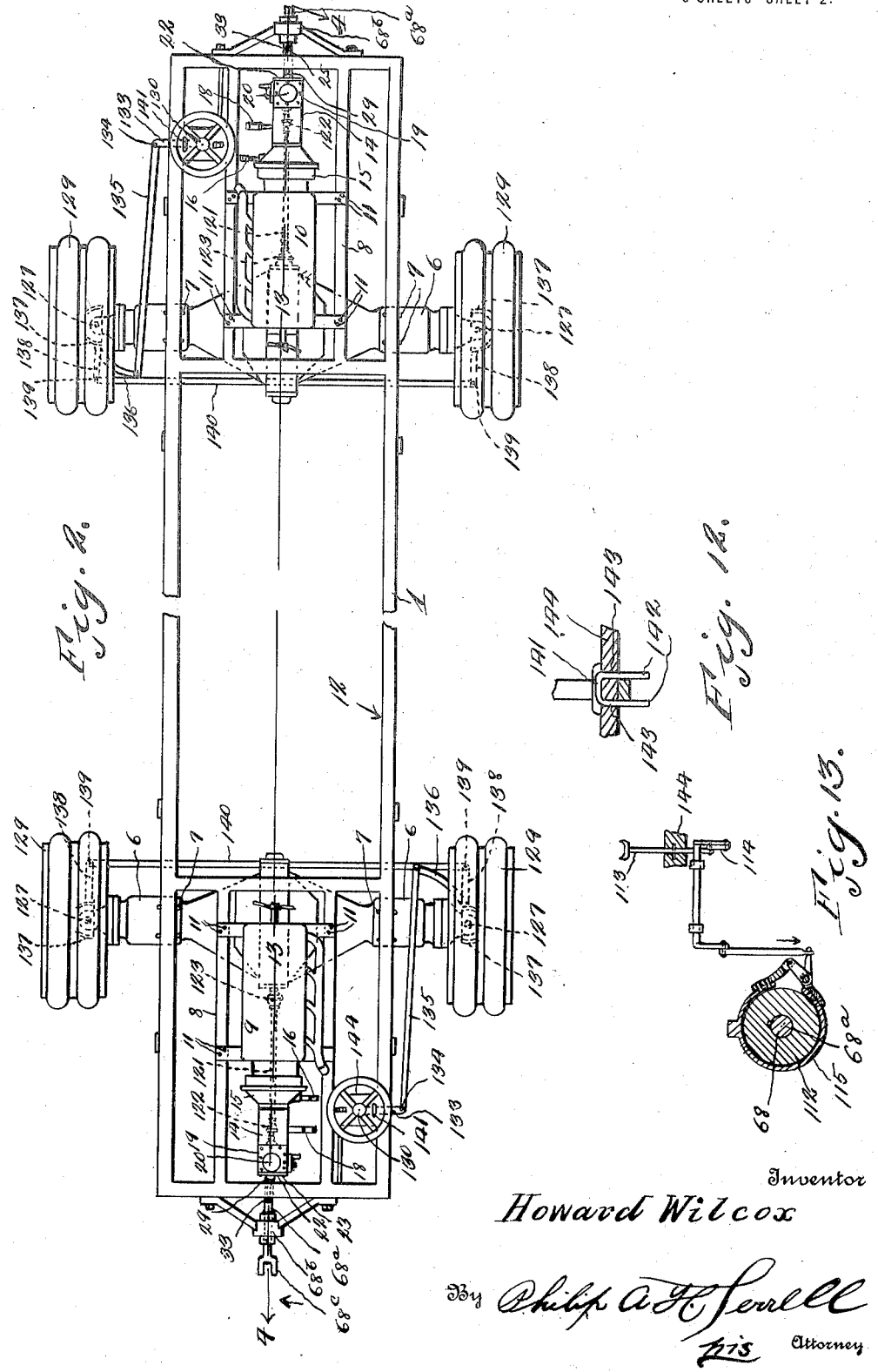

H. WILCOX.
MOTOR DRIVEN VEHICLE TRAIN.
APPLICATION FILED OCT. 21, 1918.
1,308,315.
Patented July 1, 1919.
6 SHEETS—SHEET 3.
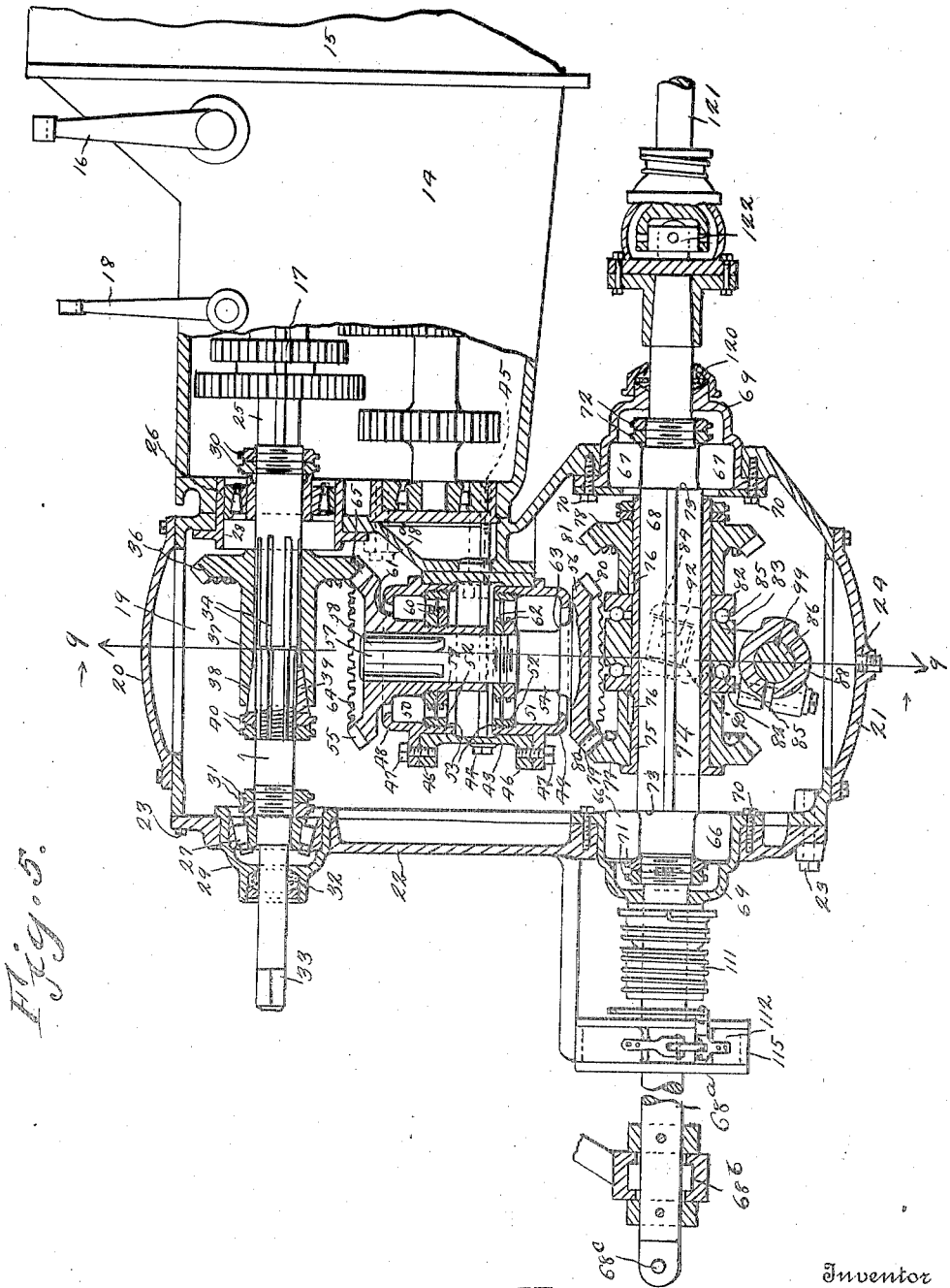
Inventor
Howard Wilcox
his Attorney

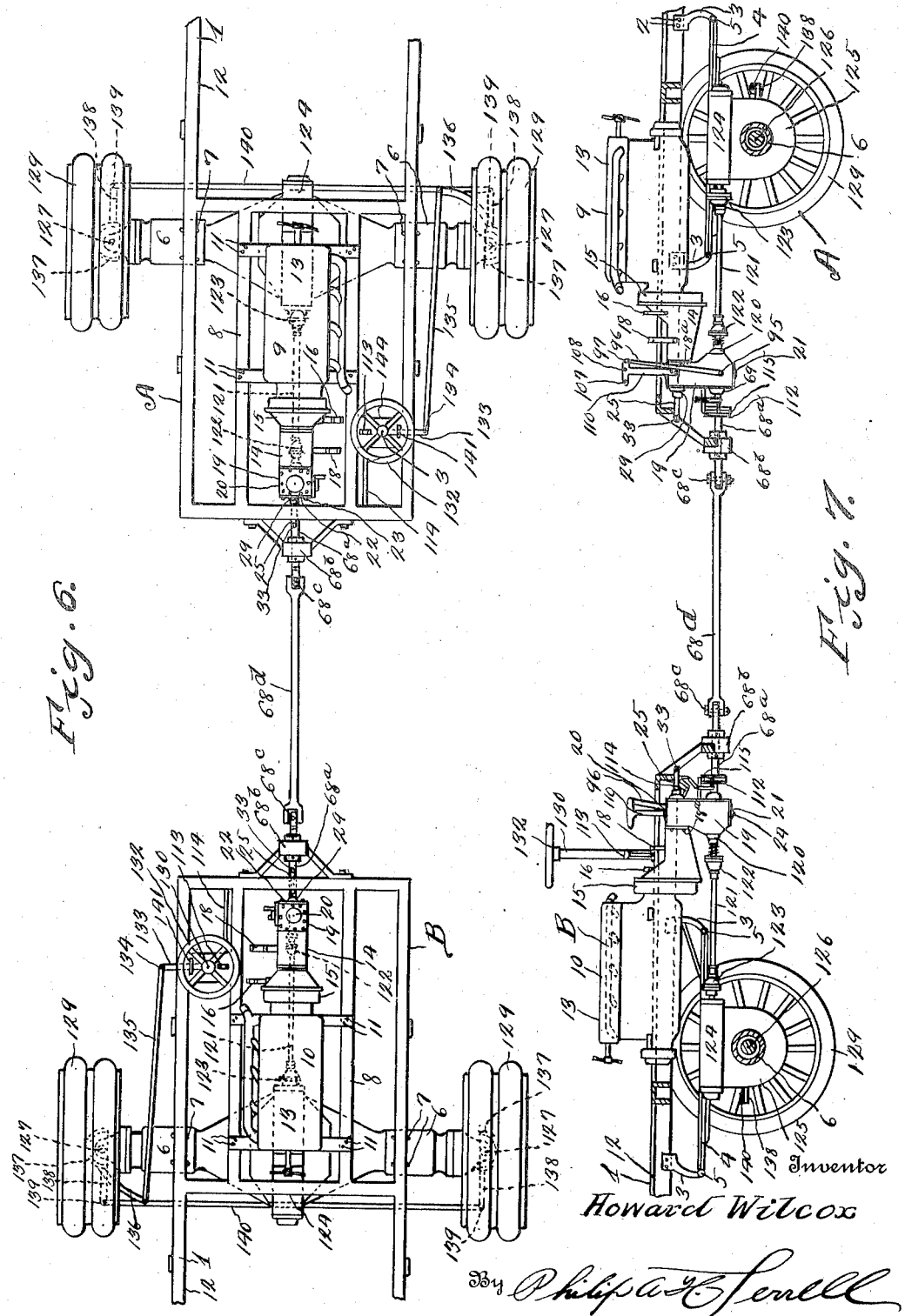

H. WILCOX.
MOTOR DRIVEN VEHICLE TRAIN.
APPLICATION FILED OCT. 21, 1918.

1,308,315.

Patented July 1, 1919.
6 SHEETS—SHEET 5.

Inventor
Howard Wilcox
By
Philip &c. Sewell
his Attorney

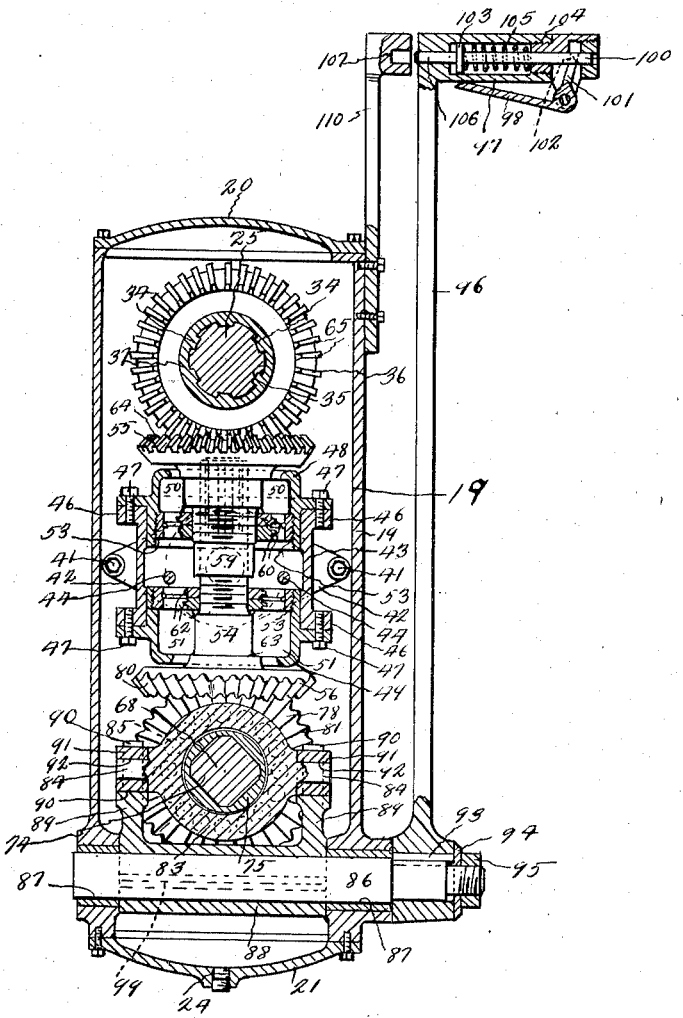

UNITED STATES PATENT OFFICE.

HOWARD WILCOX, OF WASHINGTON, DISTRICT OF COLUMBIA.

MOTOR-DRIVEN-VEHICLE TRAIN.

1,308,315.　　　　　Specification of Letters Patent.　　　Patented July 1, 1919.

Application filed October 21, 1918. Serial No. 258,966.

*To all whom it may concern:*

Be it known that I, HOWARD WILCOX, a citizen of the United States of America, residing at the Bellevue Hotel, Washington, District of Columbia, have invented certain new and useful Improvements in Motor-Driven-Vehicle Trains, of which the following is a specification, reference being had therein to the accompanying drawing.

The invention relates to motor driven vehicle trains and has for its object to provide a motor driven vehicle train comprising a series of units, said units being provided with engines located on their ends and so constructed that power may be imparted to adjacent vehicle units located forwardly or rearwardly of the propelling vehicle, or from the other vehicles units to the various units forming the train. Also to provide a vehicle train so constructed as to obviate the necessity of turning around, also to adapt the structure of my front and rear driven mechanism for motor vehicles, set forth in my application for patent filed June 1st, 1918, serial number 237,737 to a motor driven train.

A further object is to eliminate the trailing of a second vehicle which is common practice at the present time and provide a motor driven vehicle which will do its own tractoring when the wheels of the pulling vehicle are mired or spinning on ice or for any reason not tractoring. In this way the trailed vehicle will push the propelling vehicle out of the mire and the vehicle train as a whole will advance without delay.

A further object is to so construct the vehicle units so that their driving shafts and connecting shafts, between the vehicles, will be substantially in alinement.

A further object is to so construct the units of the motor vehicle train so that a forward and reverse mechanism will be interposed between the driving shafts of each unit and the driving shaft of each of the adjacent units.

A further object is to so construct the units of a motor driven vehicle train so that the same may be propelled by any one of the various engines, of the units, or by all or any number of said engines.

Other objects will appear and be better understood from the embodiment of the invention of which the following is a specification reference being had to the accompanying drawings forming a part thereof, in which:—

Figure 1 is a side elevation of one of the units of the vehicle train.

Fig. 2 is a top plan view of the same.

Fig. 3 is an end view of one of the units.

Fig. 4 is a longitudinal sectional view on line 4—4 of Fig. 2.

Fig. 5 is an enlarged sectional view of the driving mechanism and part of the engine.

Fig. 6 is a plan view of the adjacent ends of two of the units.

Fig. 7 is a sectional view through the adjacent ends of two of the units, showing the connection between the same.

Fig. 9 is a sectional view on line 9—9 of Fig. 5.

Fig. 10 is a detail view of the forward and reverse gears.

Fig. 11 is a sectional detail view of one of the flexible axles.

Fig. 12 is a detail sectional view showing conventional means for locking any of the various steering mechanisms.

Fig. 13 is a sectional view through the brake and showing the brake actuating mechanism.

Figure 8:
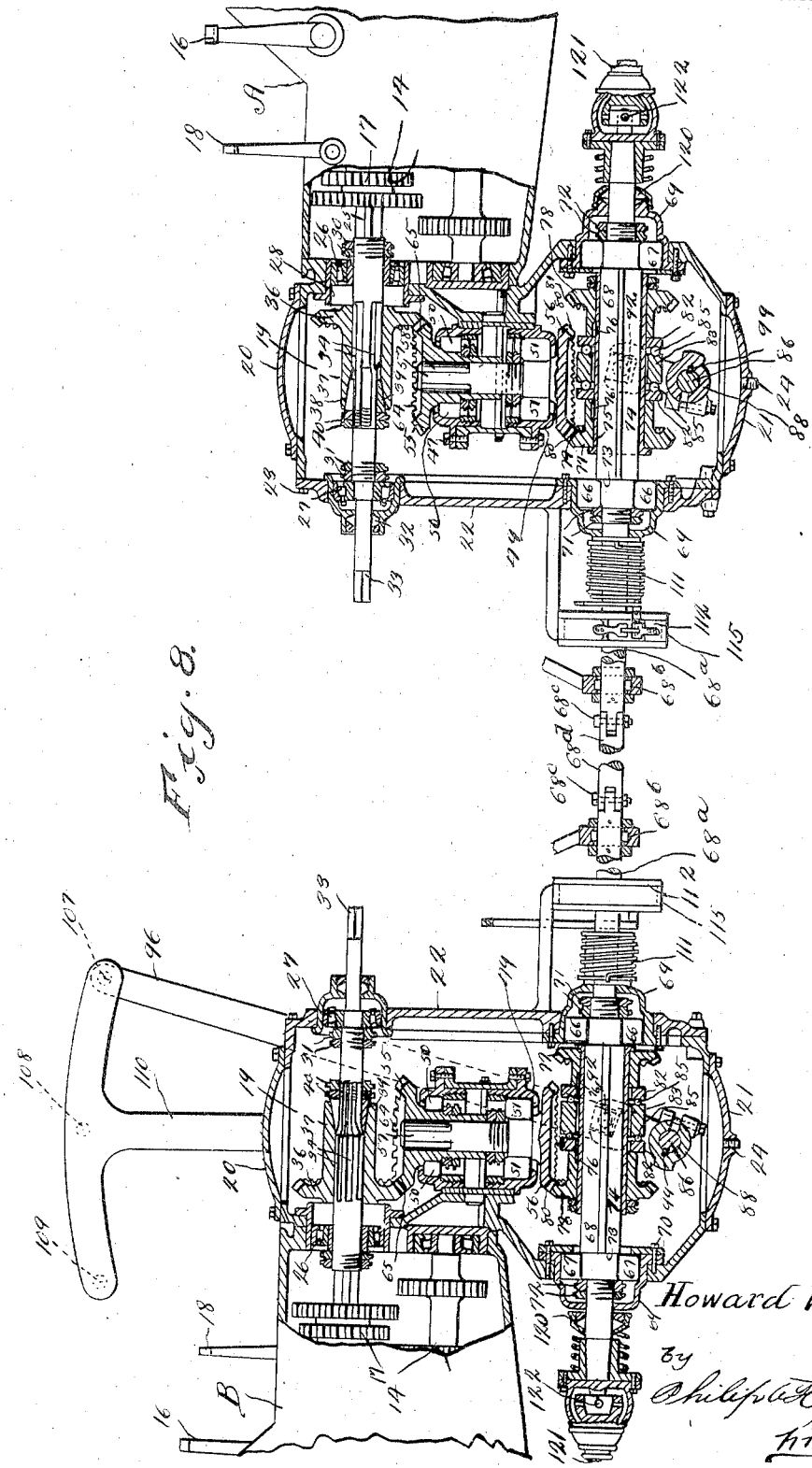
Fig. 8 is a sectional view through the adjacent mechanisms located on adjacent units.

Referring to the drawings A designates one of the units of a motor vehicle train and B a similar unit which may be located either forwardly, rearwardly or at both ends of the unit A. The construction of each unit of the train is the same; therefore only one unit will be described in detail; however, the various numerals will apply to corresponding parts of the various units.

The numeral 1 designates a frame and secured to the frame on each side thereof as at 2 are downwardly extending brackets 3, to which the ends of the springs 4 are attached as at 5. These springs 5 are in turn secured to the axle casing 6 by means of the U-bolts 7, thereby resiliently supporting the frame from the axles of the vehicles. Each end of the frame is provided with an engine foundation 8, to which engines 9 and 10 are secured at 11. The engines are disposed between the axles of the vehicle and the ends thereof so that there will be a free space between the engines, thereby providing a vehicle free of mechanism in its central portion 12 for the reception of any type of bottom dump body. The engines 9 and 10 have their cylinder portions 13 substantially adjacent a vertical center line of the axles, but forward of the same and their transmission ends 14 extending toward the ends of the vehicle. From this it will be seen that the engines are in opposed or reversed positions to each other. Each engine 9 and 10 is provided with the usual clutch mechanism, not shown, but carried in the casing 15 and controlled by means of the foot lever 16. Each engine is also provided with a transmission mechanism 17 which is mounted in the transmission casings of the engines 9 and 10 and are under the control of the operator by means of the levers 18. The type of engines to be used and the particular construction of the clutch mechanism and transmission may be of any type or construction and may vary according to the size of vehicle desired.

Both ends of the vehicle are alike and the mechanism of the same construction; therefore the power transmission mechanism of one end of the vehicle will be described and the numerals will apply to the mechanism located at the other end.

Secured to the transmission casing 15 of the engine by means of the bolts 18ᵃ is a casing 19, which is provided with top and bottom removable plates 20 and 21 bolted thereto so that the mechanism contained in the casing 19 may be easily reached for repairing, cleaning or assembling. The casing 19 is also provided with a face plate 22 which is secured to the casing by means of the bolts 23. The bottom plate 21 is provided with an opening 24, for draining the casing of oil when it is desired to remove the oil therefrom. The transmission driving shaft 25, extends through the upper end of the casing and is supported in anti-frictional bearings 26 and 27, which are carried by the bearing cages 28, said anti-frictional bearings being held in the cages 28 and 29 by means of the locked nuts 30 and 31, which retain the anti-frictional bearings in the bearing cages. The cage 29 is provided with a packing gland 32, through which the reduced cranking end 33 of the shaft 25 extends. The shaft 25 is provided with a series of longitudinal slots 34, which receive the lugs 35 of the bevel gear 36. The sleeve portion 37 of the gear 36 is provided with a tapering opening 38. A split tapering sleeve 39 is forced into the tapering opening 38 of the sleeve of the bevel gear, thereby preventing longitudinal movement of the gear 36 on the shaft 25 and is prevented from longitudinal movement on the shaft 25 by means of the locked nuts 40. Secured to the transmission casing 14 by means of the bolts 41, which pass through apertures in the arms 42 is a cylindrical casing 43. This casing is additionally secured to the transmission casing by means of the bolts 44 which thread into the transmission casing as at 45. The cylindrical casing is provided with flanges 46 and secured to the flanges 46, of the casing 43 by means of the bolts 47 are anti-frictional bearing cages 48 and 49, which are provided with anti-frictional bearings 50 and 51 which are held in said cages as at 53. Mounted in the bearings 50 and 51 and supported thereby is a vertical shaft having bevel gears 55 and 56. The gear 56 is integral with the shaft 54, while the gear 55 is rigidly secured to the end 57 of the shaft by means of the vertical slots 58, engage corresponding lugs on the sleeve portion 59 of the gear 55. Locking nuts 60 are threaded upon the sleeve 59; thereby preventing displacement of the anti-frictional bearings 50 which engage the shoulder 61 of the gear 55. Locking nuts 62 are threaded upon the shaft 54 and engage the bearings 51, thereby preventing displacement of the bearings from engagement with the shoulder 63 of the gear 56. From the above it will be seen, that the shaft 54 is supported in anti-frictional bearings insuring the best of running condition and at the same time, reducing the friction between the rotatable parts to a minimum. The teeth 64 of the gear 55 are in mesh with the teeth 65 of the gear 36, therefore when a revoluble movement is imparted to the transmission shaft 25, the shaft 54 will be caused to rotate and also the gears 55 and 56 which are rigidly secured thereto and therefore will rotate therewith.

Rotatably mounted in anti-frictional bearings 66 and 67 located at the lower end of the casing 18 is a horizontal shaft 68. The bearings 66 and 67 are carried by the bearing cages 69, which are secured to the casing 19 by means of the bolts 70. Locking nuts 71 and 72 are threaded upon the shaft and prevent displacement of the anti-frictional bearings in relation to the shoulders 73 of the shaft 68. The portion of the shaft 68 designated by the numeral 74 is substantially square in cross section and slidably mounted upon the portion 74 is a sleeve 75, which is adapted to rotate with, but slidably move upon the section 74 of the shaft 68. Keyed to the slidable sleeve 75 by means of the keys 76 are bevel gears 77 and 78. Gear 77 is the forward gear while gear 78 is the reverse gear. When the teeth 79 of the forward gear 77 are in mesh with the teeth 80, of the gear 56, the vehicle will be propelled in the direction of the arrow $a$. While when the teeth 81 of the gear 78 are in mesh with the teeth 80 of the gear 56 the vehicle will be propelled in the direction of the arrow $b$. Anti-frictional bearing plates 82 are mounted upon the slidable sleeves 75 and disposed between the sleeves of the bevel gears 77 and 78. An anti-frictional bearing sleeve 83 is mounted upon the slidable sleeve 75 and is provided with lugs at diametrically opposite sides thereof. Anti-frictional bearings 85 are disposed between the bearing plates 82 and the sides of the sleeve 83 thereby reducing the friction when the gears are rotated and the sleeve 83 remaining stationary.

A rock shaft 86 is transversely disposed and rockably mounted in bearings 87 at the lower end of the casing 19. This shaft is at right angles to the shaft 68. Secured by means of the key 99 to the shaft 86 is a sleeve 88, which is adapted to be rocked with the shaft 86. This sleeve 88 is provided with upstanding arms 89, having bifurcations 90, in which slidable blocks 91 are slidably mounted. These blocks 91 are provided with apertures 92, which receive the lugs 84 at diametrically opposite sides of the sleeve 83. Keyed as at 93 and additionally secured by means of the washer 94 and nut 95 is the forward and reverse operating lever 96, this lever is provided with a handle 97 and hand grip 98. Slidably mounted in the handle 97 is a detent pin 100. The arm 101 of the hand grip 98 engages an aperture 102, in the pin 100 so that the pin 100 can be oscillated by means of the grip 98. The detent pin 100 is provided with an annular flange 103 and between this flange and the shoulder 104 a coiled spring is disposed for normally maintaining the nose 106 of the detent pin 100 in engagement with any of the apertures 107, 108 or 109 of the bracket 110. One end of the shaft 68 is provided with a spring actuated packing box 111 and also with a brake 112, which is actuated by means of the lever 113, rod 114 and brake band 115. The other end of the shaft 68 is provided with a spring actuated packing box 120 to prevent leakage of oil which may fill the casing 19. One end of the driving shaft 121 is connected to the shaft 68 by means of a universal joint 122, its other end being connected to the differential driving mechanism by means of the universal joint 123. The differential driving mechanism and differential are of any construction and are not shown, but they are carried in the casings 124 and 125. The axles are of the usual flexible type and are provided with universal joints 127 and rotate the wheels 129 of the vehicle.

The ends 68$^a$ of the shafts 68 are rotatably mounted in bearings 68$^b$ of brackets, said ends 68$^a$ of the shafts 68, at the ends of each unit are universally connected at 68$^c$ to each other, by means of the connection rods 68$^d$.

It will be seen, that when the transmission shaft 25 is rotated, the shaft 54 will also rotate as the bevel gears 56 and 55 are in mesh. The gear 50 being integral with the shaft will also rotate, the speed of rotation being governed by the speed of the transmission mechanism. When it is desired to move the vehicle in the direction of the arrow $a$, the lever 96 is moved so that the pin 106 will engage the aperture 109, thereby sliding the sleeve 74 and the gears 77 and 78. The teeth 79, of the gear 77 will mesh with the teeth 80 of the gears 56, thereby imparting revoluble movement to the shaft 68, which will revolve the driving shaft 121, the differential driving mechanism and differential, which in turn will revolve the axle 26 and consequently the wheels 129. From the foregoing it will be seen that power will be transmitted to the wheels, and that said power will be under a variable control of the operator of the vehicle. When it is desired to run the vehicle in the opposite direction the lever 96 is moved until the end 106 of the detent pin 100 engages the aperture 107. When so placed the teeth 81 of the reverse gear 78 will engage the teeth 80 of the gear 56, which will revolve the shaft 68 and driving shaft 121, in the opposite direction. It will be noted that when the vehicle is going in one direction the forward gear 77 is in engagement with the gear 56 at the end in the direction in which the vehicle is going, while the reverse gear 78 is in engagement with the gear 56 at the other end of the vehicle. For instance, while the engines are going full speed, one of the axles would be revolving full speed in forward gear, while the other would be revolving full speed in reverse gear.

It will be seen that power, from the engine, at either, or both ends of any of the units, may be transmitted to the axles of adjacent units through the medium of the connecting rods 68$^d$ between the units, which are universally connected to the ends of the shafts 68. It will also be seen that by means of the forward and reverse mechanisms at the adjacent ends of the units, power from the engines of the adjacent units may be transmitted to the driving shafts 121. In other words, the vehicle train may be propelled by power from one or all of the units. If from one unit, it is obvious that the wheels of adjacent units will assist in driving the vehicle train as a whole.

The units may be connected together by means of any form of drawbar (not shown) and the steering mechanism may be of any construction, however a conventional form of steering mechanism is shown at the ends of each unit.

From the above, it will be seen, that the motor train may be run in either direction without the necessity of turning the train around. It will also be seen that if any of the units become mired, the other units will either pull or push the same out of the mire. If the engines of any of the units become disabled the vehicle train as a whole will be propelled by the undamaged engines. Therefore a vehicle train is provided, which is particularly adapted for use over roads which may be in bad condition and not of sufficient width to allow the operator of a motor driven vehicle train to turn the train around.

Steering mechanism.

A double steering mechanism is provided, one mechanism being located at each end of the vehicle, each mechanism being adapted to be operated by operators located at each end of the vehicle. Both steering mechanisms are of the same construction, but are provided with means whereby when it is desired to use the vehicle as a two wheel steered vehicle instead of a four wheel one, one of the mechanisms may be locked and the vehicle steered from one end only.

The steering mechanisms comprise steering posts 130 which are rotatably mounted in bearings 131 and are provided with steering wheels 132. Secured to the lower ends of the steering posts are arms 133 and pivotally connected to the arms 133 as at 134 are links 135, which are in turn connected to the arms 136 of the wheel turning knuckles 137. The wheel turning knuckles 137 are provided with arms 138 and pivotally secured as at 139 to said arms are connecting rods 140 by means of which the wheels will be moved in unison when the steering wheels are turned in one direction or the other. When it is desired to lock one of the steering mechanisms a U-shaped bolt 141, having arms 142, may be passed through the apertures 143 of a portion 144 of the frame. From this it will be seen that the mechanism at either end of the vehicle may be locked, and also that both mechanisms may be used at the same time thereby providing a vehicle which can be steered with two or four wheels.

The invention having been set forth what is claimed as new and useful is:—

1. A motor driven vehicle train comprising a series of vehicles, each vehicle having engines located at its ends, said engines driving adjacent axles of the vehicle on which they are located and the axles of vehicles located forwardly and rearwardly of said vehicle.

2. A motor driven vehicle train comprising alined vehicles, one of said vehicles having engines located at its ends and adapted to transmit power toward the ends of said vehicles, thence downwardly and toward the center of the vehicle to its wheels and means whereby the wheels at the adjacent ends of the next vehicles will be driven by the motors on the adjacent ends of the first mentioned vehicle.

3. A motor driven vehicle train comprising a series of vehicles, one of said vehicles having engines located at its ends, said engines operating vertical shafts, forward and reverse mechanism adapted to be thrown into and out of engagement with gears on the lower ends of said vertical shafts, said forward and reverse mechanisms when in operation rotating shafts, one end of each of said shafts being connected to driving shafts and driving the axles of the vehicle, the other ends of the shafts being connected and adapted to rotate driving shafts leading to the axles of the vehicles located forwardly and rearwardly of the vehicle.

4. A motor driven vehicle train comprising alined vehicles, one of said vehicles having an engine located at its end substantially above the axle, said engine transmitting power by a shaft toward the adjacent end of said vehicle and downwardly by a shaft, thence by a driving shaft inwardly to the axle of the vehicle, a driving shaft connected to the first mentioned driving shaft and extending outwardly from the vehicle and operating the axle and wheels of the adjacent alined vehicle.

5. A motor driven vehicle train comprising alined vehicles, one of said vehicles having an engine located at its end, said engine operating a vertical shaft, forward and reverse mechanism adapted to be thrown into and out of engagement with a gear on the lower end of the vertical shaft, said forward and reverse mechanism rotating a shaft, one end of said shaft being connected to a driving shaft for driving the axle of the vehicle, the other end of the shaft being connected to and adapted to rotate a driving shaft leading to the axle or driving mechanism of the other vehicle.

6. A motor driven vehicle train comprising alined vehicles, one of said vehicles having an engine located at its end, said engine operating a vertical shaft, forward and reverse mechanism adapted to be thrown into and out of engagement with a gear on one end of the vertical shaft, said forward and reverse mechanism rotating a shaft, one end of said shaft being connected to a driving shaft for driving the axle of the vehicle, the other end of the shaft being connected to and adapted to rotate a driving shaft leading to the differential or driving mechanism of another vehicle, the driving shafts and reverse mechanism shaft being in horizontal alinement with each other.

7. A motor driven vehicle train comprising alined vehicles, one of said vehicles having an engine located at its end, said engine operating a vertical shaft, forward and reverse mechanism adapted to be thrown into and out of engagement with a gear on the lower end of the vertical shaft, said forward and reverse mechanism rotating a shaft, one end of said shaft being connected to a driving shaft for driving the axle of the vehicle, the other end of the shaft being connected to a driving shaft leading to the driving mechanism of another vehicle, the driving shafts and reverse mechanism being substantially in horizontal alinement with each other and brake mechanism carried by the forward and reverse shaft.

8. A motor driven vehicle train comprising alined vehicles, one of said vehicles having an engine located at its end, said engine operating a vertical shaft supported and rotatable in anti-frictional bearings, forward and reverse mechanism adapted to be thrown into and out of engagement with a gear on the lower end of the vertical shaft, said forward and reverse mechanism rotating a shaft supported by and rotatable in anti-frictional bearings, one end of said shaft being connected to a driving shaft for driving the axle of the vehicle, the other end of the shaft being connected to a driving shaft leading to the wheel driving mechanism of another vehicle, said shaft and forward and reverse mechanism being substantially in horizontal alinement with each other and brake mechanism for braking the rotation of the forward and reverse shaft.

9. A motor driven vehicle train comprising a series of vehicles, one of said vehicles having engines located substantially forwardly and rearwardly of its axles, means for transmitting power toward its ends, thence downwardly, thence toward the center of the vehicle to drive the axles of the vehicle on which said engines are located and means whereby power from said engines will be imparted to drive the wheels of vehicles located forwardly and rearwardly of the vehicle on which the engines are located.

10. A motor driven vehicle train comprising a series of vehicles, one of said vehicles having engines located substantially forwardly and rearwardly of its axles, means for transmitting power toward its ends, thence downwardly, thence toward the center of the vehicle driving the axles of the vehicle on which the engines are located, and means for imparting power from said engines to the axles of adjacent vehicles.

11. A motor driven vehicle train comprising a series of motor driven vehicles, each vehicle being provided with engines for driving the wheels of the vehicle on which it is located and means whereby the engine of said vehicle will drive the axle of the adjacent vehicle.

12. A motor driven vehicle train comprising a series of motor driven vehicles, each vehicle having engines for driving the wheels thereof, means whereby said engines will drive the axles of adjacent vehicles and means whereby the engines on the adjacent vehicles may be thrown into driving operation with the driving shaft thereof.

13. A motor driven vehicle train comprising a series of motor driven vehicles, each vehicle being provided with engines at its ends, said engines driving the axles of the vehicles at the ends on which it is located, driving connections between the engines at the ends of adjacent vehicles and clutch means whereby the engines on the adjacent ends of the vehicles may be operated independently or in unison for driving the axles at the adjacent ends of the vehicles.

14. A motor driven vehicle train comprising a series of motor driven vehicles, each vehicle having engines located at its ends and adapted to transmit power toward its ends, thence downwardly and toward the center of the vehicle to its axles, means for driving the axles of adjacent vehicles and means whereby power may be transmitted from the adjacent vehicles to the first mentioned vehicle.

15. A motor driven vehicle train comprising a series of motor driven vehicles, each vehicle having engines located at its ends, said engines operating vertical shafts, forward and reverse mechanisms adapted to be thrown into and out of engagement with gears on the lower ends of said vertical shafts, said forward and reverse mechanisms when in operation rotating shafts, one end of said shafts being connected to driving shafts and driving the axles of the vehicle, the other ends of the shafts being connected to and adapted to rotate driving shafts leading to the axles of adjacent vehicles of the train and means whereby the power from the engines of the adjacent vehicles may be imparted to the driving shafts.

16. A motor driven vehicle train comprising alined motor driven vehicles, each vehicle having an engine located at its end, said engine operating a vertical shaft, forward and reverse mechanisms adapted to be thrown into and out of engagement with a gear on the lower end of the vertical shaft, one end of said shaft being connected to a driving shaft for driving the axle of the vehicle, the other end of the shaft being connected to the driving shaft of an adjacent vehicle and means whereby the power from the engine of the adjacent vehicle may be imparted to the driving shafts of either vehicle.

17. A motor driven vehicle train comprising a series of vehicles, each vehicle having engines located at its ends, said engines driving adjacent axles of the vehicle on which they are located and the axles of vehicles located forwardly and rearwardly of said vehicle, steering mechanisms at the ends of the vehicles and means whereby either of the steering mechanisms may be locked thereby permitting the running of the vehicle train in either direction without turning the same around.

18. A motor driven vehicle train comprising a series of motor driven vehicles, each vehicle having engines at its ends, driving means whereby said engines will drive the axles of the vehicle on which it is located and means whereby power from the engines of said vehicle may be imparted to the axles of adjacent vehicles and vice versa.

19. A motor driven vehicle train comprising a series of vehicles, each of said vehicles having an engine at its end, said engines driving the axle of the vehicle on which it is located, driving connections between said engines and means whereby power from the engines located on the ends of the vehicles may be transmitted to the axles of both vehicles at the same time or to either one as desired.

In testimony whereof I hereunto affix my signature.

HOWARD WILCOX.